US011792364B2

(12) United States Patent
Hinckley et al.

(10) Patent No.: US 11,792,364 B2
(45) Date of Patent: Oct. 17, 2023

(54) HEADSET VIRTUAL PRESENCE

(71) Applicant: Microsoft Technology Licensing, LLC, Redmond, WA (US)

(72) Inventors: Kenneth P. Hinckley, Kirkland, WA (US); Michel Pahud, Kirkland, WA (US); Mar Gonzalez Franco, Seattle, WA (US); Edward Sean Lloyd Rintel, Cambridge (GB); Eyal Ofek, Redmond, WA (US); Jaron Zepel Lanier, Berkeley, CA (US); Molly Jane Nicholas, Berkeley, CA (US); Payod Panda, Raleigh, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/333,737

(22) Filed: May 28, 2021

(65) Prior Publication Data
US 2022/0385855 A1    Dec. 1, 2022

(51) Int. Cl.
*H04N 7/14* (2006.01)
*G06F 3/01* (2006.01)

(52) U.S. Cl.
CPC ............ *H04N 7/147* (2013.01); *G06F 3/012* (2013.01); *G06F 2203/011* (2013.01)

(58) Field of Classification Search
CPC ... H04N 7/14; G06F 3/02; G06F 3/011; G06F 3/012; G06F 3/014
USPC ........................................... 348/14.01–14.16
See application file for complete search history.

(56) References Cited

U.S. PATENT DOCUMENTS

| 9,225,307 | B2 | 12/2015 | Reilly et al. |
| 10,467,792 | B1 * | 11/2019 | Roche ..................... G06F 40/20 |
| 2010/0306711 | A1 | 12/2010 | Kahn et al. |
| 2014/0152538 | A1 | 6/2014 | Ham et al. |

(Continued)

FOREIGN PATENT DOCUMENTS

| CN | 104932679 A | 9/2015 | |
| JP | 3725880 B2 * | 12/2005 | ............... H04L 5/14 |

(Continued)

OTHER PUBLICATIONS

Weller, et al., "Using Internet Video Calls in Qualitative (Longitudinal) Interviews: Some Implications for Rapport", in International Journal of Social Research Methodology, vol. 20, Issue 6, Nov. 2, 2017, pp. 613-625.

(Continued)

*Primary Examiner* — Melur Ramakrishnaiah

(57) ABSTRACT

Aspects of the present disclosure relate to headset virtual presence techniques. For example, a participant of a communication session may not have an associated video feed, for example as a result of a user preference to disable video communication or a lack of appropriate hardware. Accordingly, a virtual presence may be generated for such a non-video participant, such that the non-video participant may be represented within the communication session similar to video participants. The virtual presence may be controllable using a headset device, for example such that movements identified by the headset device cause the virtual presence to move. In some instances, user input may be received to control emotions conveyed by the virtual presence, for example specifying an emotion type and/or intensity.

20 Claims, 11 Drawing Sheets

(56) References Cited

U.S. PATENT DOCUMENTS

| | | | |
|---|---|---|---|
| 2015/0172832 A1 | 6/2015 | Sharpe et al. | |
| 2017/0048613 A1 | 2/2017 | Smus et al. | |
| 2017/0237786 A1* | 8/2017 | Crowe | H04L 65/403 |
| | | | 709/204 |
| 2017/0280223 A1 | 9/2017 | Cavarra et al. | |
| 2017/0302709 A1* | 10/2017 | Jones | G06F 3/04817 |
| 2018/0181370 A1 | 6/2018 | Parkinson | |
| 2019/0306607 A1 | 10/2019 | Clayton et al. | |
| 2019/0341897 A1 | 11/2019 | Wahlberg et al. | |
| 2020/0344536 A1 | 10/2020 | Jackson et al. | |
| 2021/0104236 A1* | 4/2021 | Doggett | G10L 15/1822 |
| 2021/0342020 A1* | 11/2021 | Jorasch | G06F 21/32 |
| 2022/0382506 A1 | 12/2022 | Hinckley et al. | |

FOREIGN PATENT DOCUMENTS

| | | | | |
|---|---|---|---|---|
| WO | WO-2017156570 A1 * | 9/2017 | | A61B 3/113 |
| WO | 2020176893 A1 | 9/2020 | | |

OTHER PUBLICATIONS

"Apple Introduces AirPods Max, the Magic of Airpods in a Stunning Over-Ear Design", Retrieved From: https://www.apple.com/ng/newsroom/2020/12/apple-introduces-airpods-max-the-magic-of-airpods-in-a-stunning-over-ear-design/, Dec. 8, 2020, 9 Pages.

"Bose Frames Original Version", Retrieved From: http://web.archive.org/web/20191216100315/https://www.bose.com/en_us/products/frames.html, Dec. 16, 2019, 8 Pages.

Bailly, et al., "Head-Controlled Menu in Mixed Reality with a HMD", in Proceedings of IFIP International Conference Human-Computer Interaction, Aug. 23, 2019, 22 Pages.

Begault, et al., "Applying Spatial Audio to Human Interfaces: 25 Years of NASA Experience", in Proceedings of the Audio Engineering Society Conference: 40th International Conference: Spatial Audio: Sense the Sound of Space, Oct. 8, 2010, 10 Pages.

Boker, et al., "Effects of Damping Head Movement and Facial Expression in Dyadic Conversation Using Real-Time Facial Expression Tracking and Synthesized Avatars", in Journal of Philosophical Transactions of the Royal Society B: Biological Sciences, vol. 364, Issue1535, Dec. 12, 2009, pp. 3485-3495.

Brandt, et al., "Experimental Design Research: Genealogy, Intervention, Argument", in International Association of Societies of Design Research, Nov. 10, 2007, 17 Pages.

Buil, et al., "Headphones with Touch Control", in Proceedings of the 7th International Conference on Human-Computer Interaction with Mobile Devices and Services, Sep. 19, 2005, pp. 377-378.

Castelli, et al., "Why Students Do Not Turn on Their Video Cameras During Online Classes and an Equitable and Inclusive Plan to Encourage Them to Do so", in Journal of Ecology and Evolution, vol. 11, Issue 8, Jan. 10, 2021, pp. 3565-3576.

Chen, et al., "Exploring User Defined Gestures for Ear-Based Interactions", in Proceedings of the ACM on Human-Computer Interaction, vol. 4, Nov. 4, 2020, 20 Pages.

Cooper, et al., "The Effects of Substitute Multisensory Feedback on Task Performance and the Sense of Presence in a Virtual Reality Environment", in Journal of PloS one, vol. 13, Issue 2, Feb. 1, 2018, 25 Pages.

Dagan, et al., "Design Framework for Social Wearables", in Proceedings of the Designing Interactive Systems Conference, Jun. 23, 2019, pp. 1001-1015.

Dierk, et al., "Use Your Head! Exploring Interaction Modalities for Hat Technologies Modalities", in Proceedings of the Designing Interactive Systems Conference, Jun. 23, 2019, pp. 1033-1045.

Freeman, et al., "Multimodal Feedback in HCI: Haptics, Non-Speech Audio, and Their Applications", in the Handbook of Multimodal-Multisensor Interfaces: Foundations, User Modeling, and Common Modality Combinations, vol. 1, Apr. 24, 2017, pp. 277-317.

Gaver, et al., "Effective Sounds in Complex Systems: the ARKola Simulation", in Proceedings of the SIGCHI Conference on Human Factors in Computing Systems, Apr. 27, 1991, pp. 85-90.

Gutwin, et al., "Chalk Sounds: the Effects of Dynamic Synthesized Audio on Workspace Awareness in Distributed Groupware", in Proceedings of the ACM Conference on Computer Supported Cooperative Work, Mar. 19, 2011, pp. 85-94.

Hashimoto, et al., "Study on Natural Head Motion in Waiting State with Receptionist Robot SAYA that has Human-Like Appearance", in IEEE Workshop on Robotic Intelligence in Informationally Structured Space, Mar. 31, 2009, 6 Pages.

Hiipakka, et al., "A Spatial Audio User Interface for Generating Music Playlists", in Proceedings of the International Conference on Auditory Display, Jul. 6, 2003, 4 Pages.

Junuzovic, et al., "To See or Not to See: a Study Comparing Four-Way Avatar, Video, and Audio Conferencing for Work", in Proceedings of the 17th ACM International Conference on Support Group Work, Oct. 27, 2012, pp. 31-34.

Zimmerman, et al., "An Analysis and Critique of Research through Design: Towards a Formalization of a Research Approach", in Proceedings of the 8th ACM Conference on Designing Interactive Systems, Aug. 16, 2010, pp. 310-319.

Kendon, Adam, "Some Uses of the Head Shake", in Journal of Gesture, vol. 2, Issue 2, Jan. 1, 2002, pp. 147-182.

Kikuchi, et al., "EarTouch: Turning the Ear into an Input Surface", in Proceedings of the 19th International Conference on Human-Computer Interaction with Mobile Devices and Services, Sep. 4, 2017, 6 Pages.

Zolyomi, et al., "Managing Stress: the Needs of Autistic Adults in Video Calling", in Proceedings of the ACM on Human-Computer Interaction, vol. 3, Nov. 7, 2019, 29 Pages.

Kuno, et al., "Combining Observations of Intentional and Unintentional Behaviors for Human-Computer Interaction", in Proceedings of the SIGCHI Conference on Human Factors in Computing Systems, May 15, 1999, pp. 238-245.

Lee, et al., "Designing Socially Acceptable Hand-to-Face Input", in Proceedings of the 31st Annual ACM Symposium on User Interface Software and Technology, Oct. 14, 2018, pp. 711-723.

Lin, et al., "Manipulation of Remote 3D Avatar through Facial Feature Detection and Real Time Tracking", in IEEE International Conference on Multimedia and Expo, Aug. 22, 2001, pp. 1064-1067.

Lissermann, et al., "EarPut: Augmenting Ear-Worn Devices for Ear-Based Interaction", in Proceedings of the 26th Australian Computer-Human Interaction Conference on Designing Futures: the Future of Design, Dec. 2, 2014, pp. 300-307.

Manabe, et al., "Headphone Taps: a Simple Technique to Add Input Function to Regular Headphones", In Proceedings of the 14th International Conference on Human-Computer Interaction with Mobile Devices and Services Companion, Sep. 21, 2012, pp. 177-180.

Manabe, et al., "Tap Control for Headphones Without Sensors", in Proceedings of the 24th Annual ACM Symposium on User Interface Software and Technology, Oct. 16, 2011, pp. 309-313.

McGookin, et al., "An Initial Investigation into Non-Visual Computer Supported Collaboration", in Proceedings of the Conference on Human Factors in Computing Systems, Apr. 28, 2007, pp. 2573-2578.

Mehta, et al., "FakeBuster: a DeepFakes Detection Tool for Video Conferencing Scenarios", in Repository of arXiv:2101.03321v1, Jan. 9, 2021, 5 Pages.

Mendes, et al., "Collaborative Tabletops for Blind People: the Effect of Auditory Design on Workspace Awareness", in Proceedings of the ACM on Human-Computer Interaction, vol. 4, Nov. 4, 2020, 19 Pages.

Metatla, et al., "I Hear You": Understanding Awareness Information Exchange in an Audio-Only Workspace, in Proceedings of Conference on Human Factors in Computing Systems, Apr. 21, 2018, 13 Pages.

Metzger, et al., "FreeDigiter: a Contact-Free Device for Gesture Control", in Proceedings of the 8th International Symposium on Wearable Computers, vol. 1, Oct. 31, 2004, 4 Pages.

(56) References Cited

OTHER PUBLICATIONS

Zhang, et al., "Light Weight Background Blurring for Video Conferencing Applications", in Proceedings of International Conference on Image Processing, Oct. 8, 2006, 4 Pages.

Neustaedter, et al., "Blur Filtration Fails to Preserve Privacy for Home-Based Video Conferencing", In ACM Transactions on Computer-Human Interaction, vol. 13, Issue 1, Mar. 1, 2006, 36 Pages.

Neustaedter, et al., "Mobile Video Conferencing for Sharing Outdoor Leisure Activities Over Distance", in Journal of Human-Computer Interaction, vol. 35, Issue 2, Mar. 3, 2020, 31 Pages.

Nicas, et al., "A Study Quantifying the Hand-to-Face Contact Rate and Its Potential Application to Predicting Respiratory Tract Infection", in Journal of Occupational and Environmental Hygiene, vol. 5, Issue 6, Apr. 25, 2008, pp. 347-352.

Oh, et al., "Let the Avatar Brighten Your Smile: Effects of Enhancing Facial Expressions in Virtual Environments", in Journal of PloS One, vol. 11, Issue 9, Sep. 7, 2016, 18 Pages.

Oulasvirta, Antti, "Finding Meaningful Uses for Context-Aware Technologies: the Humanistic Research Strategy", in Proceedings of the SIGCHI Conference on Human Factors in Computing Systems, vol. 6, Issue 1, Apr. 24, 2004, pp. 247-254.

Schoessler, et al., "Cord UIs: Controlling Devices with Augmented Cables", in Proceedings of the 9th International Conference on Tangible, Embedded, and Embodied Interaction, Jan. 15, 2015, pp. 395-398.

Siu, et al., "Virtual Reality Without Vision: a Haptic and Auditory White Cane to Navigate Complex Virtual Worlds", in Proceedings of the CHI Conference on Human Factors in Computing Systems, Apr. 25, 2020, 13 Pages.

Walker, et al., "Diary in the Sky: a Spatial Audio Display for a Mobile Calendar", in People and Computers XV-Interaction without Frontiers, Sep. 10, 2001, pp. 531-539.

Weigel, et al., "DeformWear: Deformation Input on Tiny Wearable Devices", in Proceedings of the ACM on Interactive, Mobile, Wearable and Ubiquitous Technologies, vol. 1, Issue 2, Jun. 30, 2017, 23 Pages.

Zimmerman, et al., "Research Through Design as a Method for Interaction Design Research in HCI", in Proceedings of the SIGCHI Conference on Human Factors in Computing Systems, Apr. 28, 2007, pp. 493-502.

Yan, et al., "HeadGesture: Hands-Free Input Approach Leveraging Head Movements for HMD Devices", in Proceedings of the ACM on Interactive, Mobile, Wearable and Ubiquitous Technologies, vol. 2, Issue 4, Dec. 27, 2018, 23 Pages.

Molinsky, et al., "Cracking the Nonverbal Code: Intercultural Competence and Gesture Recognition Across Cultures", in Journal of Cross-Cultural Psychology, vol. 36, Issue 3, May 1, 2005, pp. 380-395.

"Non Final Office Action Issued in U.S. Appl. No. 17/333,582", dated Mar. 11, 2022, 13 Pages.

"Notice of Allowance Issued in U.S. Appl. No. 17/333,582", dated Jan. 26, 2023, 7 Pages.

"Final Office Action Issued in U.S. Appl. No. 17/333,582", dated Sep. 21, 2022, 15 Pages.

"International Search Report and Written Opinion Issued in PCT Application No. PCT/US22/027951", dated Aug. 16, 2022, 14 Pages.

\* cited by examiner

HEADSET VIRTUAL PRESENCE

BACKGROUND

Headset devices are commonly used for experiencing audio output from computing devices and, as a result, are socially acceptable and have associated pre-existing conventions. However, headset devices generally have limited input functionality, even in spite of their ubiquitous nature.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to computing device headset input. In examples, sensor data from one or more sensors of a headset device are processed to identify implicit and/or explicit user input. A context may be determined for the user input, which may be used to process the identified input and generate an action that affects the behavior of a computing device accordingly. As a result, the headset device is usable to control one or more computing devices. As compared to other wearable devices, headset devices may be more prevalent and may therefore enable more convenient and more intuitive user input beyond merely providing audio output.

As another example, aspects of the present disclosure relate to headset virtual presence techniques. For example, a participant of a communication session may not have an associated video feed, for example as a result of a user preference to disable video communication, or a lack of appropriate hardware. Accordingly, a virtual presence may be generated for such a non-video participant, such that the non-video participant may be represented within the communication session similar to video participants. The virtual presence may be controllable using a headset device, for example such that movements identified by the headset device cause the virtual presence to move. In some instances, user input may be received to control emotions conveyed by the virtual presence, for example specifying an emotion type and/or intensity.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1A:
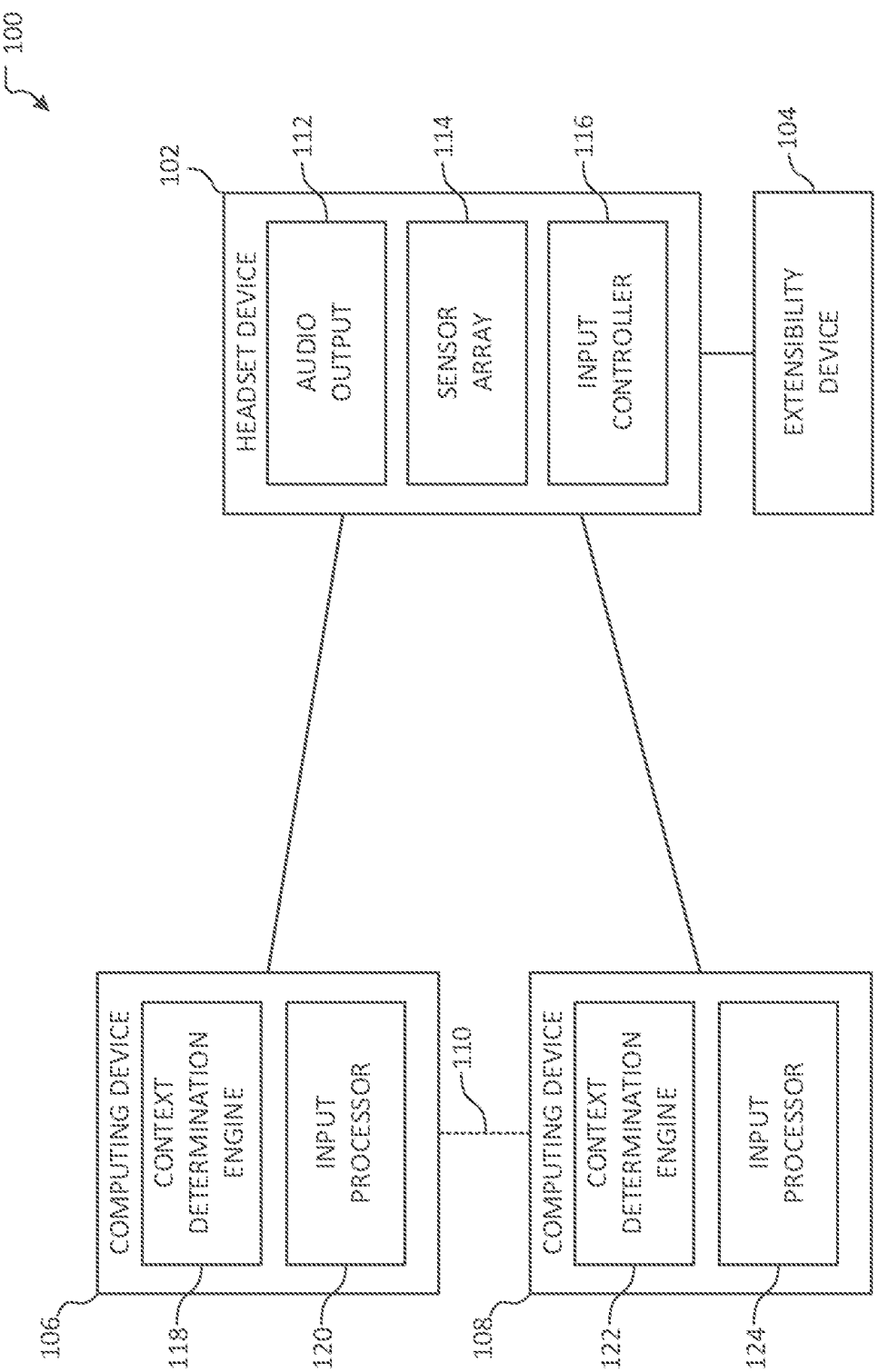
FIG. 1A illustrates an overview of an example system for user input from a headset device to a set of computing devices

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In examples, a headset device may be used as a peripheral for a computing device, or a local personal device ecology of multiple devices, for example to enable a user to experience audio output, which may be mixed from one or more of the computing devices. Further, headset devices may be commonplace and their use may be socially acceptable with associated pre-existing conventions. However, while the headset device may enable the user to control audio output, it operates largely as an output device. In some instances, a headset device may further comprise sensors that are similarly used to control audio playback, for example automatically pausing audio output when the headset is removed from a user's head. Thus, despite the ubiquitous and potentially sensor-rich nature of headset devices, their use is generally limited to audio output.

Accordingly, aspects of the present disclosure relate to headset virtual presence. In examples, sensor data of a headset device may be processed to generate an action associated with a determined context. Operation of a computing device associated with the headset may be affected based on the generated action accordingly, thereby enabling the wearer of the headset device to control the computing device. For example, the user input and/or resulting action may control the computing device in addition to or as an alternative to controlling media playback of the computing device (e.g., playing/pausing media and/or media volume control). In some instances, control of the computing device may result from explicit and/or implicit user input, e.g., as may be identified via one or more sensors of the headset device. Thus, a potentially commonplace headset device may provide input to a computing device. As compared to other wearable devices, headset devices may exhibit a greater degree of user adoption and social acceptability, such that input via a headset device may be more convenient and/or intuitive for a user.

As used herein, a headset device may include any of a variety of functionality, including, but not limited to, audio output, video output, voice input, and/or physical input (e.g., via one or more mechanical buttons, touch-sensitive surfaces, proximity sensors, capacitance sensors, light sensors, accelerometers, gyroscopes, and/or inertial measurement units (IMUs)). In some instances, a headset device may be a wired headset device (e.g., such that it is connected to a computing device via one or more wired connections) and/or a wireless headset device (e.g., such that it communicates with a computing device using one or more wireless communication modes, such as Bluetooth Low Energy (BLE), Wi-Fi, and/or infrared (IR)). The bidirectional communication with one or more computing devices (whether wired or wireless) may also be indirect, for example via the cloud. As used herein, a video headset device, such as a head-mounted display (HMD), includes video output functionality (e.g., via one or more displays and, in some instances, associated lenses and/or mirrors), while an audio headset device (e.g., headphones or earbuds) does not include such video output functionality. Thus, it will be appreciated that a headset device may include any of a variety of input and/or output functionality according to aspects described herein. Further, while examples herein are described in the context of a headset device, it will be appreciated that similar techniques may be applied to any of a variety of other wearable devices, including, but not limited to, a smartwatch or smart glasses.

In some examples, functionality of a headset device may be extensible. For example, an extensibility device may be electrically, mechanically, and/or communicatively coupled with the headset device, thereby extending its input functionality. A user may attach, remove, or change a set of extensibility devices coupled with a headset device to change its functionality. For example, a user may select an extensibility device to provide one set of input functionality in one context and may select a different extensibility device to provide a second set of input functionality in a different context. Thus, it will be appreciated that any number and/or variety of extensibility devices may be used according to aspects described herein.

Aspects described herein may control any of a variety of computing devices, including, but not limited to, mobile computing devices, tablet computing devices, desktop computing devices, and video game console computing devices. It will be appreciated that a headset device may be used to control one or more such computing devices. For example, a headset device may be in wired communication, wirelessly paired, and/or otherwise associated with a set of computing devices, such that the headset device provides input to one or more of the computing devices at a given time. In some instances, user input may be identified to change the computing device for which the headset device provides input. As an example, it may be determined that a user's head has moved to orient the user's gaze toward a target computing device (e.g., away from another computing device of the set of computing devices), such that the headset device provides input to the target computing device accordingly (e.g., in addition to or as an alternative to another computing device).

Any of a variety of inputs may be detected using sensor data of a headset device. For example, it may be detected whether a user is wearing the headset device, partially wearing the headset device (e.g., that an ear cup is rotated or pulled away, that one earbud is removed, or that the headset device is around the user's neck), or is not wearing the headset device. As another example, it may be detected that the user's head is moving or a position (e.g., gaze direction and/or head rotation about one or more axes) of a user's head may be detected. In other examples, touch input, swipe input, and/or a hand gesture in physical space (e.g., as may be detected by a proximity sensor or IR depth perception sensor) may be detected. In some instances, a user's mouth movements may be detected, for example based on facial reflectivity (e.g., as may be detected by an IR emitter/sensor pair or using an image sensor) or vibrations. In other instances, a headset device may comprise one or more physical input controls, such as buttons, sliders, and/or joysticks, among other examples, such that inputs associated with such input controls may be detected accordingly.

A context associated with a detected input may be determined, such that an action may be generated for the input accordingly. For example, the context may be determined by the headset device and/or a computing device. Example contexts include, but are not limited to, one or more applications executing on the computing device, a foreground or active application, an application type (e.g., a video conferencing application type, an audio conferencing application type, a productivity application type, a video game application type, or a media playback application type), a geographic location, a connection type of the headset device (e.g., wired, Wi-Fi, or Bluetooth Low Energy) and/or an operating mode of the computing device (e.g., whether the computing device is docked, in a tablet mode, or in a desktop mode). While example contexts are discussed herein, it will be appreciated that any of a variety of additional or alternative contexts may be used according to aspects of the present disclosure.

An input of a headset device may be processed according to a context to generate an action that affects the behavior of a computing device. An action may be generated by the headset device and/or by one or more computing devices of a set of associated computing devices. For example, at least a part of such processing may be performed by a headset device so as to maintain user privacy. As another example, processing may be performed by a computing device so as to conserve computing resources of the headset device (e.g., processing, memory, storage, and/or energy resources).

In some instances, inputs and/or sensor data of one or more other devices may be processed when generating an action. For example, a camera of a computing device may be used to authenticate a user wearing the headset device, an indication of which may be provided to the headset device. As a result, the headset device may enable a user to authenticate with a second computing device, such that the user need not perform a full authentication procedure with the second computing device. As another example, a magnetometer of the headset may be susceptible to interference (e.g., as a result of one or more magnets of the headset device), such that a sensor of another computing device may be used to interpret the magnetometer data of the headset device accordingly.

In examples, an action associated with an input may be defined by an application, an operating system, or a user, among other examples. Further, it will be appreciated that an action need not be a discrete action, but may instead vary according to input associated with a headset device. For example, a discrete action to mute voice input may be generated as a result of detecting that a user's gaze has shifted away from a computing device above a predetermined threshold. As another example, a volume associated with a communication session may proportionally decrease as a user's gaze shifts away from the computing device, while a volume of a second computing device may proportionally increase as the user's gaze shifts toward the second computing device. As a further example, an utterance may be processed according to headset device input, where ambiguities or pronouns within the utterance are resolved based on such input. For example, an utterance of "move this file there" may be processed according to headset positioning input indicative of where a user is looking to identify a target file and a destination (e.g., a destination folder, destination application, and/or destination device).

In some instances, a user may participate in a communication session with one or more other participants. For example, a computing device of at least one participant may generate a video stream of the participant (e.g., using an image capture device associated with the computing device) that is transmitted for display to other participants of the communication session. However, a video stream may not be available for all of the participants, such that non-video participants may not be as visible or as engaging in the communication session as compared to video participants for which video streams are available. For example, a participant may disable video for privacy reasons or may not have an image capture device with which to provide a video stream. Accordingly, certain functionality may be unavailable for non-video participants (e.g., a non-video participant may not be displayed in a composite display of video participants against a shared background) or functionality may be reduced (e.g., a non-video participant may not be displayed in a grid with video participants and may instead be displayed in a separate region). Simple nonverbal social cues like nodding one's head in understanding are also lost for such participants.

Accordingly, a virtual presence may be generated for a non-video participant and presented to other participants of the communication session. For example, a virtual presence may be a two-dimensional (2D) picture or a three-dimensional (3D) avatar or model, among other examples. In some instances, a user may select and/or customize the virtual presence. For example, a user may record or otherwise define an animation for the virtual presence, which may be performed by the virtual presence in response to user input. In some instances, a stylized or cartoon-like avatar may be preferable to a more literal or "life-like" human representation, for example to avoid an uncanny valley effect (where an almost-but-not-quite human representation elicits an uncanny sense of revulsion that a more stylized representation would not).

Input associated with a headset device may be used to control the virtual presence. For example, movement input of the headset device may move or otherwise be mapped to predefined movements of the virtual presence. As another example, a headset device may receive user input that specifies an emotion and, in some examples, an emotion intensity to be exhibited by the virtual presence (e.g. through the use of emoticons or graphical emanata). For example, different gestures may be associated with different emotions, while gesture speed or gesture force is indicative of emotion intensity. In other examples, button combinations, joystick movements, or any of a variety of inputs may be additionally or alternatively used. As a further example, movement input of the headset device may control emotion intensity. For instance, if movement is identified to be very quick and a happy emotion is to be exhibited, the emotion could be automatically emphasized. Similarly, if movement input associated with nodding is identified, the trajectory of the nodding (which could be localized) could be recognized and used to automatically modify the intensity and/or type of the emotion selected. Additionally or alternatively, voice input may be processed (e.g., based on one or more words, sentences, and/or tone) to identify an emotion and/or associated intensity for a virtual presence.

In some instances, emotion intensity may be modulated according to an identified context. For instance, if it is determined that a participant is external to the user's company, emotions exhibited by the virtual presence may be deemphasized. By contrast, the emotions exhibited by the virtual presence could be emphasized if it is determined that the communication session is casual (e.g., with coworkers, friends, and/or family). Such aspects need not be binary and may have varying degrees of modulation. For example, an external meeting may be most subdued, followed by coworkers and friends, while the virtual presence in a meeting with family may be most emotive. Further, it will be appreciated that additional or alternative contexts may be evaluated, such as which applications are launched or whether the user is presenting. Such contexts need not be confined to a computing device, and may be external to the computing device as well. For example, if a user is driving and a difficult situation is identified (e.g., according to traffic data or by the user's vehicle), the virtual presence of the user may be updated accordingly. In some instances, different emotions and/or emotion intensities may be used for different participants.

An extensibility device, such as a smartwatch or other wearable device, may be used to identify such gesture input. For example, an emotion associated with headset input could be emphasized, deemphasized, or modified according to input identified by the extensibility device. For instance a user could specify that a virtual presence should exhibit a "poker face" to external participants but exhibit real (or less muted) emotions to colleagues. Thus, a headset may enable a non-video participant to have a virtual presence alongside video participants of a communication session, even in instances where a user's computing device does not have an image capture device. Further, the input that controls the virtual presence may be implicit and/or explicit, and may be user-customizable.

In another example, user input of a headset device may be used to control a user's virtual presence in a video game application. For example, in addition or as an alternative to other user input (e.g., via a mouse, keyboard, joystick, and/or game controller device), input of a headset device may be used to control a user's perspective within the video game, thereby enabling a user to peek around a corner or duck within the video game application. As a further example, input associated with a user's head position may be used to direct voice input to a specific player, such that the specific player hears the voice input at an increased volume while other players hear the voice input at a decreased volume. In some instances, the voice input may be muffled, scrambled, or otherwise distorted. Such user input may be beneficial to a user, as the users hands may be occupied with providing user input via one or more other devices, such that input via the headset device enables user input that would otherwise be tedious or impossible for the user to provide.

FIG. 1A illustrates an overview of an example system 100 for user input from a headset device to a set of computing devices. As illustrated, system 100 comprises headset device 102, extensibility device 104, computing device 106, and computing device 108. As illustrated, computing device 106 and computing device 108 are each coupled with headset device 102, for example via a wired and/or wireless connection, as described above.

System 100 is further illustrated as comprising connection 110 between computing device 106 and computing device 108, which may be a wired and/or wireless connection. Thus, it will be appreciated that computing device 106 and computing device 108 may communicate to process input of headset device 102 and generate one or more actions accordingly, for instance when input of headset device 102 indicates a user's focus has shifted from one of computing device 106 or 108 to the other computing device. Connection 110 is illustrated using a dashed line to indicate that, in other instances, optional connection 110 may be omitted and such aspects may instead be handled via headset device 102 (e.g., using its respective connections with computing device 106 and computing device 108).

As illustrated, headset device 102 comprises audio output 112, sensor array 114, and input controller 116. In examples, audio output 112 may include one or more speakers or transducers, among other examples. In some instances, headset device 102 may further comprise video output (not pictured) or, as illustrated, headset device 102 may be an audio headset device. Sensor array 114 may comprise any of a variety of sensors, including, but not limited to, one or more mechanical buttons, touch-sensitive surfaces (e.g., on one or more ear cups or on a headband of headset device 102), proximity sensors, structured light emitters and associated sensors, capacitance sensors, image sensors, light sensors, and/or IMUs.

Sensor array 114 may additionally or alternatively include any of a variety of passive beacons. As an example, a beacon may be used by computing devices 106 and/or 108 to sense the user location and/or orientation relative to the devices. For example, reflectors of headset device 102 may be used by a camera (in conjunction with an led, in some examples) to see if the user gaze is directed to the device. Other example beacons include, but are not limited to, a visual pattern or an audio signal (e.g., from each side of headset device 102).

Input controller 116 processes sensor data from sensor array 114 to control computing device 106 and/or computing device 108 according to aspects described herein, as described in greater detail below. For example, input controller 116 may generate input data based on sensor data of sensor array 114, which is processed to generate an action for a context accordingly.

Headset device 102 is further illustrated as being coupled with extensibility device 104. Extensibility device 104 may be electrically, mechanically, and/or communicatively coupled with headset device 102, as described above. In examples, extensibility device 104 comprises one or more sensors, such that sensor data of extensibility device 104 may be processed by input controller 116, similar to sensor data of sensor array 114 discussed above. In other examples, at least a part of the sensor data of extensibility device 104 may be processed by an input controller of extensibility device 104. Thus, it will be appreciated that any of a variety of sensors, associated data, and/or processing techniques may be used to process sensor data of headset device 102 and extensibility device 104 for controlling computing device 106 and/or computing device 108. In some aspects, extensibility device 104 may be in the form-factor of removable earbuds which contain some or all of the sensing channels from the headset form-factor to the worn earbud form-factor.

Computing device 106 is illustrated as comprising context determination engine 118 and input processor 120. In examples, context determination engine 118 maintains a context of computing device 106, for example based on one or more applications executing on computing device 106, a foreground or active application, an application type, a geographic location of computing device 106, a connection type of headset device 102, and/or an operating mode of computing device 106. Thus, the context maintained by context determination engine 118 may change according to which application and/or what type of application is active, a set of applications that are currently executing on computing device 106, how headset device 102 is connected (e.g., to computing device 106 and/or 108), and/or a geographic location of computing device 106, among other examples.

Computing device 106 may receive input data from headset device 102 (e.g., as may be generated by input controller 116), where it may be processed by input processor 120. In examples, input processor 120 obtains a context maintained by context determination engine 118 and uses the context to generate an action based on received input data. For example, a mapping may be determined for the context that specifies an association between one or more actions and a given input, such that the input data may be processed according to the mapping to identify one or more actions associated therewith.

As another example, input processor 120 may process input data according to a set of action rules, which may be interdependent and/or hierarchical. The set of action rules may similarly be associated with a context. For example, input data is processed according to a set of action rules, where a child action rule is identified based on satisfaction of a parent action rule, thereby enabling a sequence of inputs to be identified. Satisfied action rules may cause an associated action to be performed, such that actions may be performed in response to the satisfaction of an intermediate action rule and/or in response to satisfaction of a leaf action rule. In examples, an association between input data and an action may be defined by an application, an operating system, or a user, among other examples. Further, it will be appreciated that an action need not be a discrete action, but may instead vary according to input associated with a headset device. It will be appreciated that any of a variety of additional or alternative techniques may be used by input processor 120 to generate actions based on input data of headset device 102.

In examples, input processor 120 processes input data associated with multiple devices. For example, input processor 120 may process input data from headset device 102 in addition to input data associated with a peripheral device (not pictured) of computing device 106 or, as another example, one or more sensors of computing device 106. Thus, it will be appreciated that input data of headset device 102 and resulting actions may be generated in conjunction with data from any of a variety of other sources.

Computing device 108 is illustrated as comprising context determination engine 122 and input processor 124. Aspects of context determination engine 122 and input processor 124 may be similar to those of context determination engine 118 and input processor 120 discussed above with respect to computing device 106 and are not necessarily re-described below in detail.

As illustrated, headset device 102 may provide input to both computing device 106 and computing device 108. For example, headset device 102 may provide input to computing device 106 and computing device 108 contemporaneously or, as another example, may select one of computing device 106 or computing device 108 as a target device for which to provide input data. Input data provided to each of computing device 106 and computing device 108 need not be the same, such that input controller 116 of headset device 102 may determine a subset of input data to provide to each computing device. In some instances, input processor 120 of computing device 106 and input processor 124 of computing device 108 may communicate, as may be the case when it is determined that headset device 102 is transitioning or should transition to providing input data to another computing device.

While system 100 is illustrated as having each of computing device 106 and computing device 108 include input processor 120 and input processor 124, respectively, it will be appreciated that, in other examples, headset device 102 may implement at least a part of the above-described functionality. Similarly, headset device 102 may implement functionality similar to that of context determination engines 118 and 122. For example, at least a part of the input data generated by input controller 116 may be processed at headset device 102 so as to maintain user privacy. As another example, such processing (or at least a part of the sensor data processing of input controller 116) may be performed by computing device 106 and/or computing device 108, as may be the case when computing resources of headset device 102 are constrained. Thus, it will be appreciated that aspects described herein may be distributed among headset device 102, extensibility device 104, computing device 106, and/or computing device 108 according to any of a variety of paradigms.

Figure 1B:
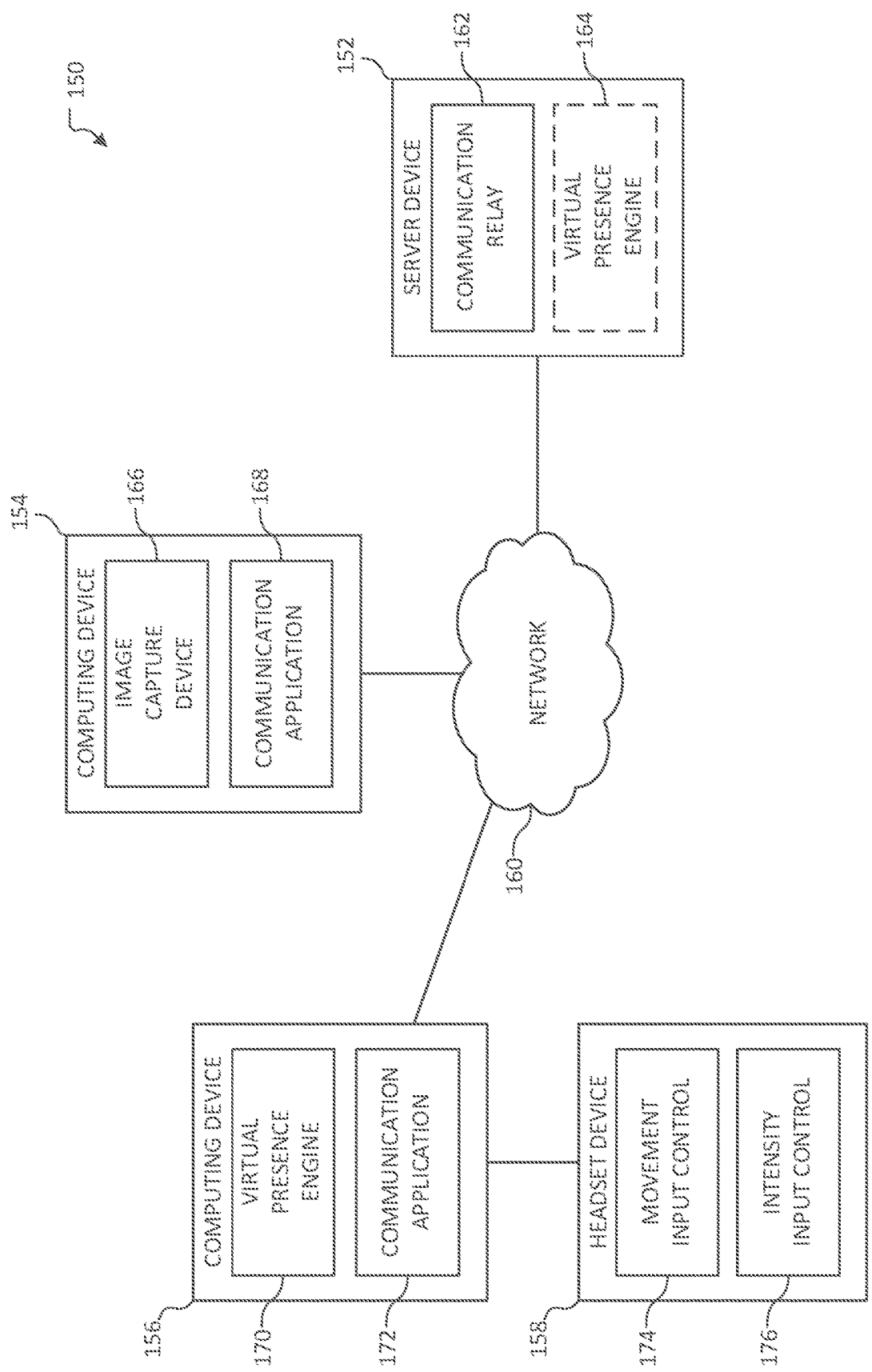
FIG. 1B illustrates an overview of an example system for virtual presence based on headset device input.

FIG. 1B illustrates an overview of an example system 150 for virtual presence based on headset device input. As illustrated, system 150 comprises server device 152, computing device 154, computing device 156, headset device 158, and network 160. Aspects of system 150 may be similar to that of system 100 discussed above with respect to system 100 of FIG. 1A and are therefore not necessarily re-described below in detail. As illustrated, server device 152, computing device 154, and computing device 156 communicate via network 160, which may comprise a local area network, a wireless network, or the Internet, or any combination thereof, among other examples.

Server device 152 is illustrated as comprising communication relay 162 and virtual presence engine 164. Virtual presence engine 164 is illustrated using a dashed box to indicate that, in some examples, virtual presence engine 164 may be omitted. Aspects of virtual presence engine 164 are discussed in greater detail below.

In examples, communication relay 162 facilitates a communication session between communication participants (e.g., users of computing device 154 and computing device 156). For example, communication relay 162 may relay communication data from computing device 154 to computing device 156 and vice versa. Example communication data includes, but is not limited to, a video stream of a participant (e.g., as may be generated using image capture device 166), a virtual presence of a participant (e.g., as may be generated by virtual presence engine 170), an audio stream, an audio and/or video file, an image, or text, among any of a variety of other data.

As illustrated, computing device 154 comprises image capture device 166 and communication application 168. For example, computing device 154 may be used by a video participant to participate in a communication session, in which communication application 168 provides a video stream of the video participant from image capture device 166 (e.g., to computing device 156 via communication relay 162). Communication application 168 may further receive and present communication data associated with other participants (e.g., from computing device 156), for example as may be relayed by communication relay 162.

As compared to computing device 154, computing device 156 may be used by a non-video participant. For example, the user of computing device 156 may determine not to provide a video stream or computing device 156 may not have an associated image capture device (not pictured). Accordingly, communication application 172 may provide a virtual presence for the non-video participant, as may be generated by virtual presence engine 170. For example, a video stream of the generated virtual presence may be provided to computing device 154 (e.g., via communication relay 162) for display to the video participant. Communication application 172 may further receive and present communication data associated with other participants (e.g., from computing device 154), for example as may be relayed by communication relay 162.

As discussed above, virtual presence engine 170 may enable a user to select or otherwise customize the virtual presence that is provided by communication application 172. For example, a user may select a virtual presence from a library of available virtual presences, may design their own, or may generate a virtual likeness based on a 2D picture or 3D scan. Virtual presence engine 170 may process input received from headset device 158 to control the generated virtual presence, such that the virtual presence is able to convey expressions, movement, and/or any of a variety of other information on behalf of the non-video participant.

As illustrated, headset device 158 comprises movement input control 174 and intensity input control 176. In examples, headset device 158 comprises any of a variety of sensors, similar to those discussed above with respect to sensor array 114 of system 100 in FIG. 1A. Accordingly, data from one or more sensors of headset device 158 may be processed by movement input control 174 to generate input data to move the virtual presence of the non-video participant, such that virtual presence engine 170 updates the virtual presence accordingly. For example, movement input control 174 may process sensor data associated with an IMU, such that head movement of the user may be used as input. As another example, movement input control 174 may process sensor data associated with an IR sensor to identify facial reflectivity, such that mouth movement of the user may be used as input. While example sensors and resulting input data are discussed, it will be appreciated that any of a variety of additional or alternative sensor data and/or input data may be used.

Similarly, intensity input control 176 may process sensor data to generate input data associated with an emotion and/or intensity to be conveyed by the virtual presence, such that virtual presence engine 170 updates the virtual presence accordingly. In examples, aspects of movement input control 174 and intensity input control 176 are similar to those of input controller 116 discussed above with respect to headset device 102 in FIG. 1A. For example, sensor data associated with a digitizer or touch sensitive surface may be processed to identify such input or, as another example, a user may actuate one or more physical controls, such as a hardware button or a joystick of headset device 158.

While example sensors, input data, and resulting virtual presence controls are described, it will be appreciated that any of a variety of other such aspects may be used. For example, a virtual presence need not be limited to movement and emotion control, and may additionally or alternatively include size control, hand signal control of the virtual presence, or cycling though a set of virtual presences, among other examples.

As noted above, server device 152 is illustrated as comprising virtual presence engine 164, which may be similar to virtual presence engine 170 discussed above with respect to computing device 156. In some instances, at least a part of the virtual presence processing described above may be performed by server device 152, thereby potentially reducing computational resource utilization at computing device 156. In some examples, virtual presence engine 170 may be omitted from computing device 156, such that input data of headset device 158 is provided as communication data from computing device 156 to server device 152, where it is processed by virtual presence engine 164 to generate a virtual presence that is relayed by communication relay 162 accordingly. Thus, it will be appreciated that aspects described herein may be distributed among server device 152, computing device 154, computing device 156, and headset device 158 according to any of a variety of paradigms.

While system 150 is described in the context of a communication among communication participants (e.g., via communication applications 168 and 172 in conjunction with communication relay 162), it will be appreciated that similar techniques may be applied to any of a variety of other application types. For example, input at headset device 158 may be used to control a video game application, where movement input control 174 identifies input to control movement within the video game application and/or to direct voice input to one or more specific users (e.g., a user of computing device 154). Further, any number of computing devices and/or associated communication participants may be used in other examples.

Figure 2:
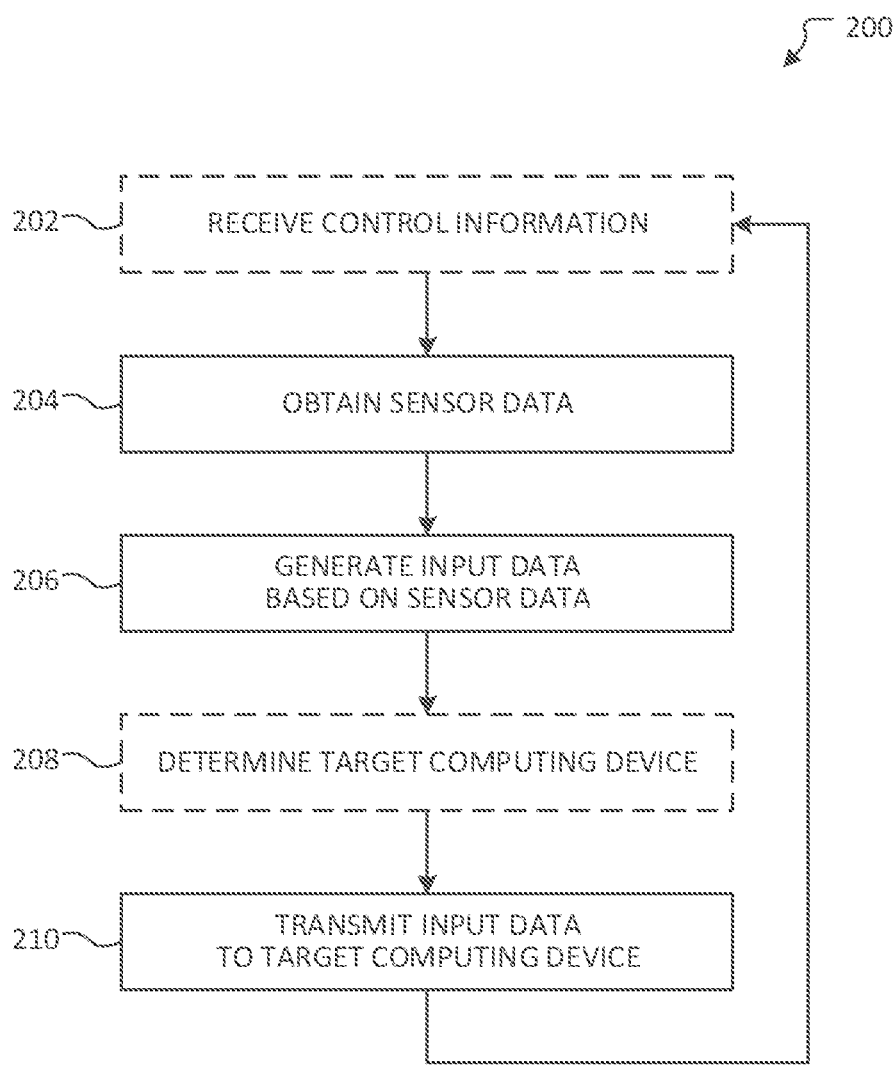
FIG. 2 illustrates an overview of an example method for processing sensor input at a headset device to control a computing device.

FIG. 2 illustrates an overview of an example method 200 for processing sensor input at a headset device to control a computing device. Aspects of method 200 may be performed by a headset device, such as headset device 102 or headset device 158 in FIGS. 1A and 1B, respectively. For example, aspects of method 200 may be performed while a headset device is providing audio output for a computing device (e.g., computing device 106 or 108 in FIG. 1A or computing device 156 in FIG. 1B) and/or while the headset device is idle, among other examples.

Method 200 begins at operation 202, where control information is received. For example, control information may be received from a computing device with which the headset device is coupled. Control information includes, but is not limited to, an indication as to a context (e.g., as may be determined by a context determination engine), an indication as to one or more types of sensor data and/or input data to be processed or generated, and/or a set of action rules, among other examples. Operation 202 is illustrated using a dashed box to indicate that, in other examples, operation 202 may be omitted such that method 200 begins at operation 204 instead. Thus, it will be appreciated that any of a variety of control information may be received or, as another example, no control information may be received.

At operation 204, sensor data is obtained. For example, sensor data may be obtained from any of a variety of sensors, similar to those discussed above with respect to sensor array 114 in FIG. 1A. As another example, sensor data may be obtained from any of a variety of other sources, such as an extensibility device (e.g., extensibility device 104 in FIG. 1A). In some instances, the obtained sensor data may comprise analog signals and/or digital signals from any of a variety of sensors. Sensor data may be obtained according to control information that was received at operation 202.

Flow progresses to operation 206, where input data is generated based on the sensor data that was obtained at operation 204. In examples, generating the input data comprises processing the sensor data to identify any of a variety of inputs. For example, sensor data may be processed according to received control information to generate input data accordingly. As an example, sensor data associated with an IMU may be processed at operation 206 to identify movement input. As another example, sensor data associated with a physical button may be processed to generate input data indicating a button was depressed or sensor data associated with a touch sensitive surface may be processed to generate input data comprising a recognized gesture. In some instances, at least a part of the sensor data may be provided for processing by a computing device rather than processing at operation 206, such that the input data generated at operation 206 comprises compressing, averaging, de-noising, and/or de-duplicating the sensor data so as to reduce the amount of data that is transmitted to the computing device. Thus, it will be appreciated that any of a variety of processing techniques may be used at operation 206.

Flow progresses to operation 208, where a target computing device is determined. In examples, the target computing device may be the computing device from which control information was received at operation 202 or the received control information may comprise an indication as to a target computing device. As another example, input data generated at operation 206 may be processed to determine the target computing device, as may be the case when head movement is detected indicating a user's gaze is shifting from one computing device to another computing device. It will be appreciated that any number of target computing devices may be determined at operation 208 or, in other examples, operation 208 may be omitted as illustrated by the dashed box.

At operation 210, the generated input data is transmitted to the target computing device. In instances where there are multiple target computing devices, the same input data may be transmitted to each computing device. As another example, a first subset of input data may be transmitted to a first computing device and a second subset of input data may be transmitted to the second computing device. The first and second subsets need not be mutually exclusive.

An arrow is illustrated from operation 210 to operation 202, indicating that flow may loop through method 200, thereby providing input data to one or more target computing devices using sensor data obtained from sensors as described above. In some instances, control information may not be received with each iteration of method 200, such that operation 202 may be omitted accordingly.

Figure 3:
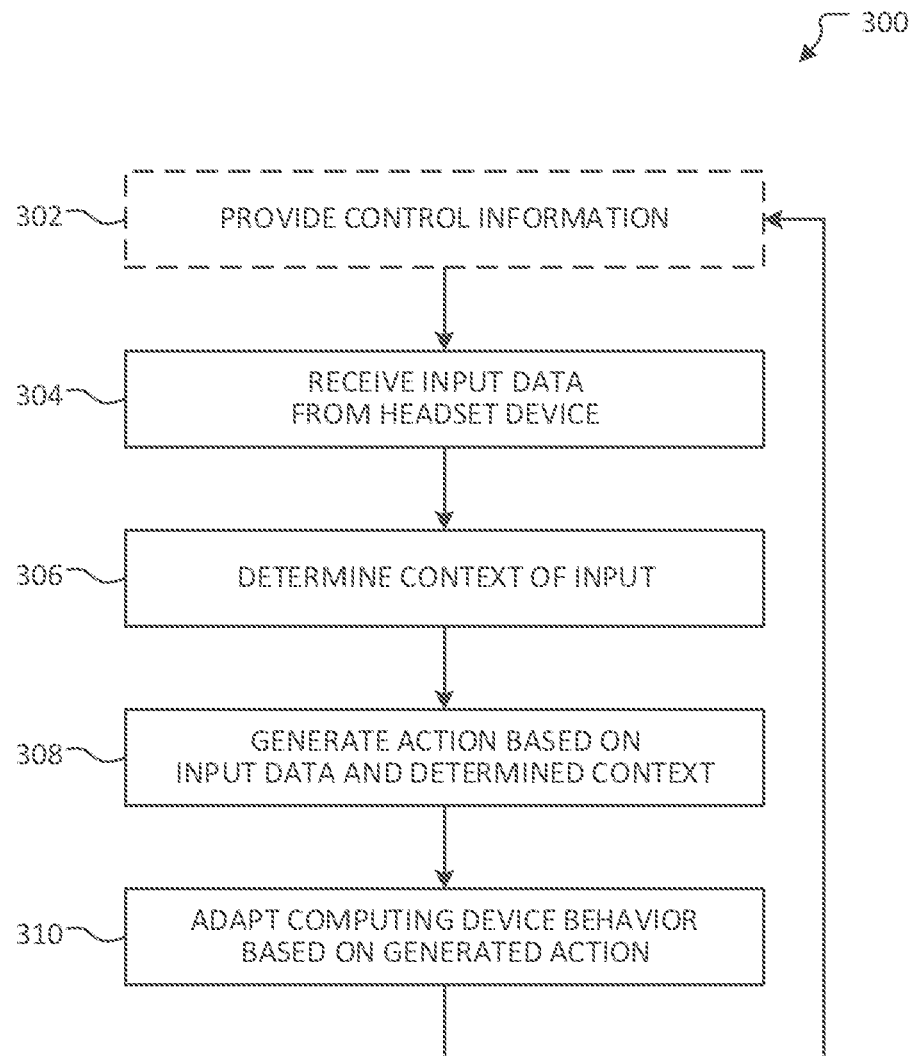
FIG. 3 illustrates an overview of an example method for processing input data from a headset device at a computing device.

FIG. 3 illustrates an overview of an example method 300 for processing input data from a headset device at a computing device. In examples, aspects of method 300 may be performed by a computing device in communication with a headset device, such as computing device 106 or 108 in FIG. 1A or computing device 156 in FIG. 1B.

Method 300 begins at operation 302, where control information is provided. As discussed above, control information includes, but is not limited to, an indication as to a context, an indication as to one or more types of sensor data and/or input data to be processed or generated, and/or a set of action rules, among other examples. Operation 302 is illustrated using a dashed box to indicate that, in other examples, operation 302 may be omitted such that method 300 begins at operation 304 instead. Thus, it will be appreciated that any of a variety of control information may be provided or, as another example, no control information may be received.

At operation 304, input data is received from the headset device. The received input data may be associated with implicit and/or explicit user input associated with one or more sensors of the headset device. For example, the input data may have been generated as a result of a headset device performing aspects of operation 206 discussed above with respect to method 200 of FIG. 2.

Flow progresses to operation 306, where a context associated with the input is determined. For example, the context may be determined by a context determination engine, such as context determination engine 118 or 122 discussed above with respect to FIG. 1A. Example contexts include, but are not limited to, one or more applications executing on the computing device, a foreground or active application, an application type, a geographic location, a connection type of the headset device, and/or an operating mode of the computing device.

At operation 308, an action is generated based on the input data received at operation 304 and the context determined at operation 306. For example, aspects of operation 308 may be performed by an input processor, such as input processor 120 or 124 discussed above with respect to FIG. 1A. For example, a mapping may be determined for the context that specifies an association between one or more actions and an input, such that the input data may be processed according to the mapping to identify one or more actions associated therewith. As another example, a set of action rules may be evaluated. The set of action rules may similarly be associated with a context. In some examples, an association between input data and an action may be defined by an application, an operating system, or a user, among other examples, such that operation 308 may comprise identifying such an association and generating an action accordingly. Further, it will be appreciated that an action generated at operation 308 need not be a discrete action, but may instead vary according to input associated with a headset device. In some instances, operation 308 may comprise processing input data associated with multiple devices according to aspects described herein.

Moving to operation 310, behavior of the computing device is adapted based on the action that was generated at operation 308. For example, an indication of the generated action may be provided to an application executing on the computing device, such that the application may handle the action accordingly. As another example, the determined action may be performed by the computing device. As discussed above, actions may be defined by an application, an operating system, or a user, among other examples.

An arrow is illustrated from operation 310 to operation 302, indicating that flow may loop through method 300, thereby providing input data to one or more target computing devices using sensor data obtained from sensors as described above. In some instances, control information may not be received with each iteration of method 300, such that operation 302 may be omitted accordingly.

Figure 4:
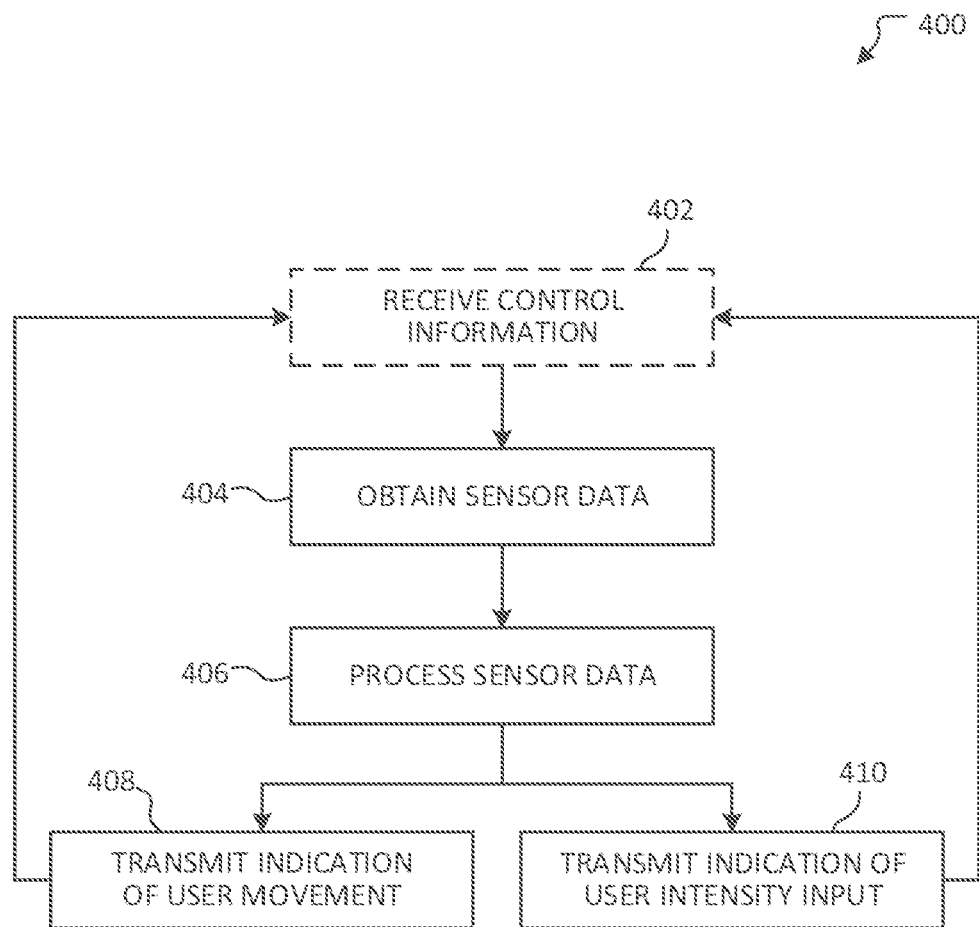
FIG. 4 illustrates an overview of an example method for processing sensor input at a headset device to control a virtual presence of a user.

FIG. 4 illustrates an overview of an example method 400 for processing sensor input at a headset device to control a virtual presence of a user. For example, aspects of method 400 may be performed by a headset device, such as headset device 102 or headset device 158 in FIGS. 1A and 1B, respectively. Aspects of method 400 may be performed while a headset device is providing audio output for a computing device (e.g., computing device 106 or 108 in FIG. 1A or computing device 156 in FIG. 1B) and/or while the headset device is idle, among other examples.

Method 400 begins at operation 402, where control information is received. For example, control information may be received from a computing device with which the headset device is coupled. Control information includes, but is not limited to, an indication as to a context, an indication as to one or more types of sensor data and/or input data to be processed or generated, and/or a set of action rules, among other examples. In some instances, the control information is associated with capabilities of a virtual presence (e.g., as may be selected or customized by a user), such that the headset device obtains sensor data and/or generates input data usable to control the virtual presence accordingly. As another example, the control information may comprise an indication to begin or end processing sensor data to control a virtual presence according to aspects described herein. Operation 402 is illustrated using a dashed box to indicate that, in other examples, operation 402 may be omitted such that method 400 begins at operation 404 instead. Thus, it will be appreciated that any of a variety of control information may be received or, as another example, no control information may be received.

At operation 404, sensor data is obtained. For example, sensor data may be obtained from any of a variety of sensors, similar to those discussed above with respect to sensor array 114 in FIG. 1A. As another example, sensor data may be obtained from any of a variety of other sources, such as an extensibility device (e.g., extensibility device 104 in FIG. 1A). In some instances, the obtained sensor data may comprise analog signals and/or digital signals from any of a variety of sensors. Sensor data may be obtained according to control information that was received at operation 402.

Flow progresses to operation 406, where the sensor data obtained at operation 404 is processed. As an example, sensor data associated with an IMU may be processed at operation 406 to identify movement input provided by a user to control a virtual presence. As another example, sensor data associated with a physical button or other input control may be processed to identify user input relating to an emotion to be conveyed by a virtual presence (e.g., a type of emotion or an intensity). Aspects of operation 406 may be performed based on control information that was received at operation 402. For example, different inputs may be identified depending on aspects of the virtual presence that is being controlled by the user. In some instances, operation 406 comprises compressing, averaging, de-noising, and/or de-duplicating sensor data that was obtained at operation 404, so as to reduce the amount of data that may be transmitted to a computing device. Thus, it will be appreciated that any of a variety of processing techniques may be used at operation 406.

At operation 408, an indication of user movement is transmitted to the computing device. Similarly, at operation 410, an indication of user intensity input is transmitted. For example, an indication may include discrete input (e.g., input to express an emotion) or may be substantially continuous (e.g., movement input changes), among other examples. As illustrated, flow progresses from operation 406 to operation 408 and/or operation 410. Thus, it will be appreciated that both operations may be performed or only one such operation may be performed in some iterations of method 400. Further, operations 408 and 410 may be performed serially or contemporaneously, among other examples.

Flow is illustrated as looping between operations 408 and/or 410 and operation 402, thereby illustrating that input to control a virtual presence may be received as a result of performing multiple iterations of method 400. In some instances, control information may not be received with each iteration of method 400, such that operation 402 may be omitted accordingly.

Figure 5:
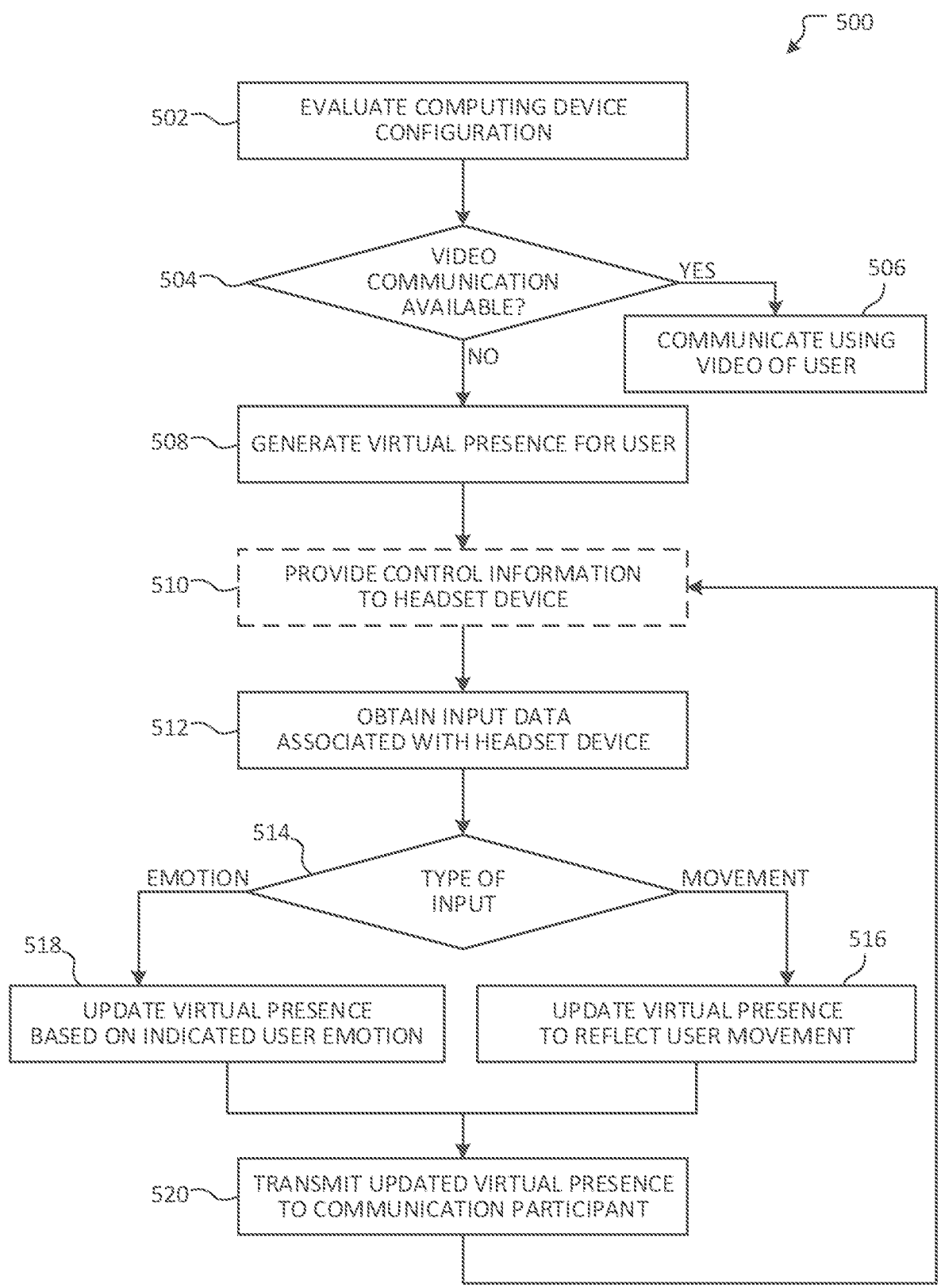
FIG. 5 illustrates an overview of an example method for generating a virtual presence for a user based on input data from a headset device.

FIG. 5 illustrates an overview of an example method 500 for generating a virtual presence for a user based on input data from a headset device. In examples, aspects of method 500 are performed by a computing device. For example, method 500 may be performed by a communication application, such as communication application 168 or 172 of computing devices 154 and 156 discussed above with respect to FIG. 1B.

Method 500 begins at operation 502, where a computing device configuration is evaluated. For example, hardware, software, and/or one or more user preferences may be evaluated at operation 502. Operation 502 may comprise determining whether an image capture device is available, whether a user has appropriate software available with which to generate a video feed, and/or whether a user has selected to enable video functionality of a communication application, among other examples. In some instances, operation 502 comprises generating a prompt or otherwise receiving user input to specify such configuration.

At determination 504, it is determined whether video communication is available. For example, if a computing device does not have appropriate hardware and/or a user preference is identified to disable video functionality, it may be determined that video communication is available. However, if it is determined that video communication is available, flow branches "YES" to operation 506, where a communication session uses a video of the user as described above.

By contrast, flow instead branches "NO" to operation 508 when it is determined that video communication is not available (e.g., such that the user may be a non-video participant of a communication session). Accordingly, at operation 508, a virtual presence is generated for the user. The virtual presence may be generated by a virtual presence engine, such as virtual presence engine 164 or virtual presence engine 170 in FIG. 1B. In some instances, the virtual presence may be generated according to a user selection and/or one or more user customizations as described herein.

Flow progresses to operation 510, where control information is provided. As discussed above, control information includes, but is not limited to, an indication as to a context, an indication as to one or more types of sensor data and/or input data to be processed or generated, and/or a set of action rules, among other examples. For example, the control information may comprise an indication as to a virtual presence for which user input is to be collected. Operation 510 is illustrated using a dashed box to indicate that, in other examples, operation 510 may be omitted. Thus, it will be appreciated that any of a variety of control information may be provided or, as another example, no control information may be received.

At operation 512, input data is received from the headset device. The received input data may be associated with implicit and/or explicit user input associated with one or more sensors of the headset device. For example, the input data may have been generated as a result of a headset device performing aspects of operations 406, 408, and/or 410 discussed above with respect to method 400 of FIG. 4.

At determination 514, flow branches according to the type of input that was received from the headset device. As illustrated, if the input was movement input, flow branches "MOVEMENT" to operation 516, where the virtual presence is updated to reflect the user movement. For example, a location of the virtual presence may move or a limb of the virtual presence may move, among other examples. By contrast, if the input was emotion input, flow branches "EMOTION" to operation 518, where the virtual presence is updated to reflect an indicated emotion. For example, a type and/or intensity of emotion may have been obtained at operation 512, such that the virtual presence is updated to reflect the emotion accordingly. It will be appreciated that, in some instances, operations 516 and 518 are both performed (e.g., contemporaneously or serially).

Flow progresses to operation 520, where the updated virtual presence is transmitted to a communication participant. For example, a representation of the virtual participant may be encoded within a video stream. The virtual presence may be transmitted directly to a participant computing device or may be relayed via a server device as discussed above with respect to FIG. 1B.

An arrow is illustrated from operation 520 to operation 510 to indicate that flow loops between operations 510-520 in order to provide a virtual presence of a non-video participant during a communication session. Even so, it will be appreciated that a participant may toggle between being a video participant and a non-video participant, such that operation 506 may be performed in some instances, while operations 508-520 may be performed in other instances.

FIGS. 6-9 and the associated descriptions provide a discussion of a variety of operating environments in which aspects of the disclosure may be practiced. However, the devices and systems illustrated and discussed with respect to FIGS. 6-9 are for purposes of example and illustration and are not limiting of a vast number of computing device configurations that may be utilized for practicing aspects of the disclosure, described herein.

Figure 6:
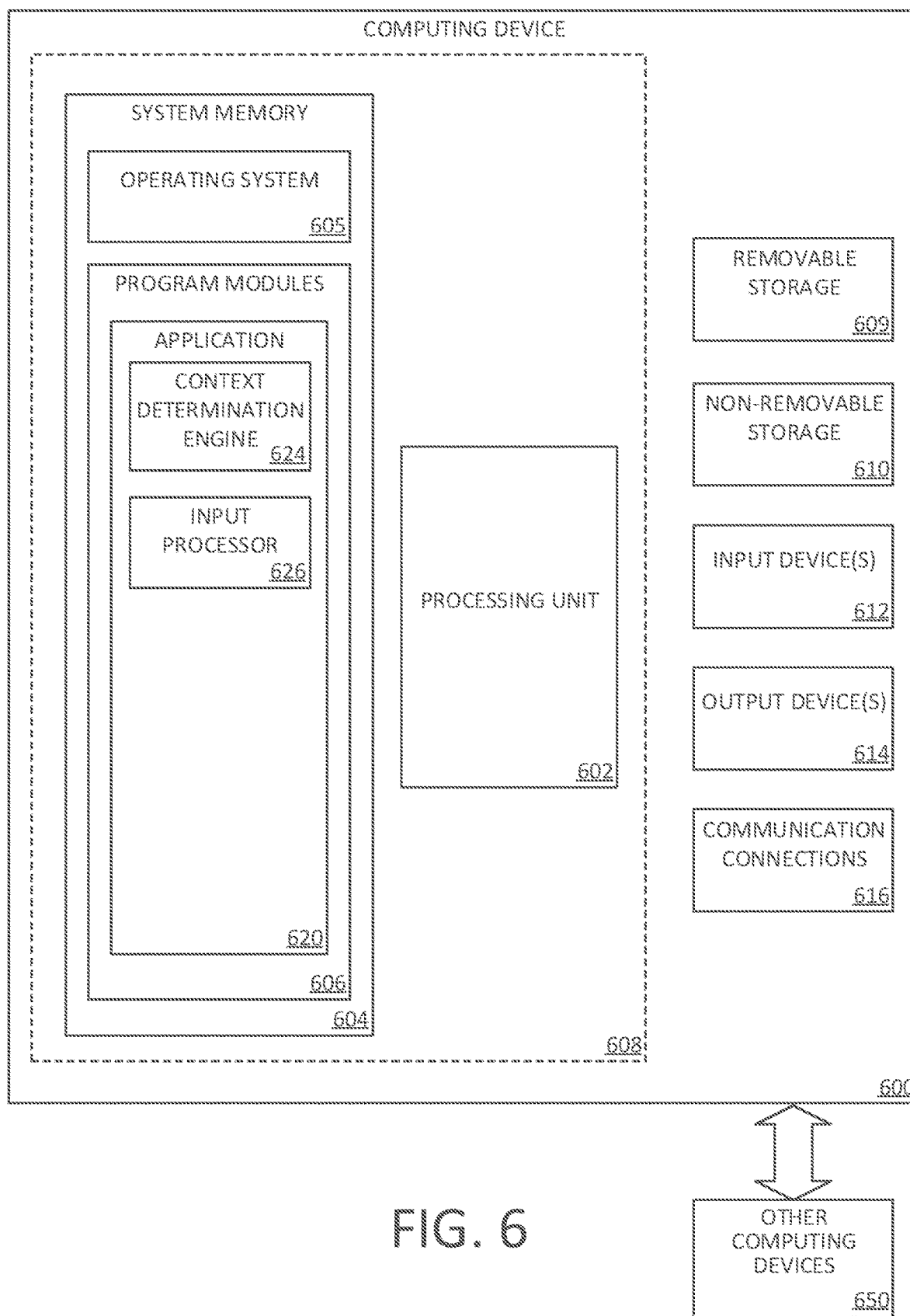
FIG. 6 is a block diagram illustrating example physical components of a computing device with which aspects of the disclosure may be practiced.

FIG. 6 is a block diagram illustrating physical components (e.g., hardware) of a computing device 600 with which aspects of the disclosure may be practiced. The computing device components described below may be suitable for the computing devices described above, including devices 102, 104, 106, and/or 108 in FIG. 1A and devices 152, 154, 156, and 158 in FIG. 1B. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories.

The system memory 604 may include an operating system 605 and one or more program modules 606 suitable for running software application 620, such as one or more components supported by the systems described herein. As examples, system memory 604 may store context determination engine 624 and input processor 626. The operating system 605, for example, may be suitable for controlling the operation of the computing device 600.

Furthermore, embodiments of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 (e.g., application 620) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 600 may also have one or more input device(s) 612 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of suitable communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 7A:
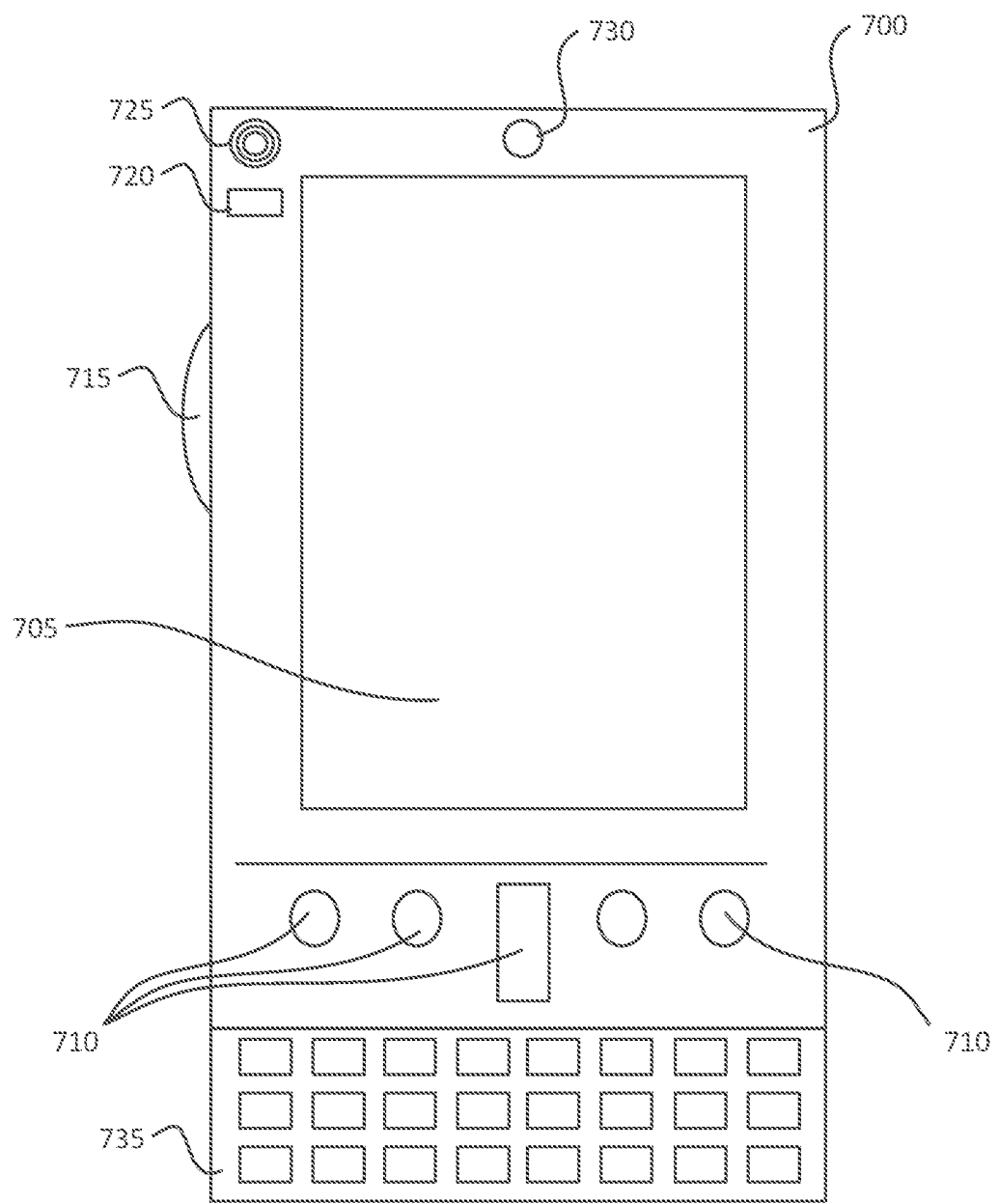
FIGS. 7A and 7B are simplified block diagrams of a mobile computing device with which aspects of the present disclosure may be practiced.
Figure 7B:
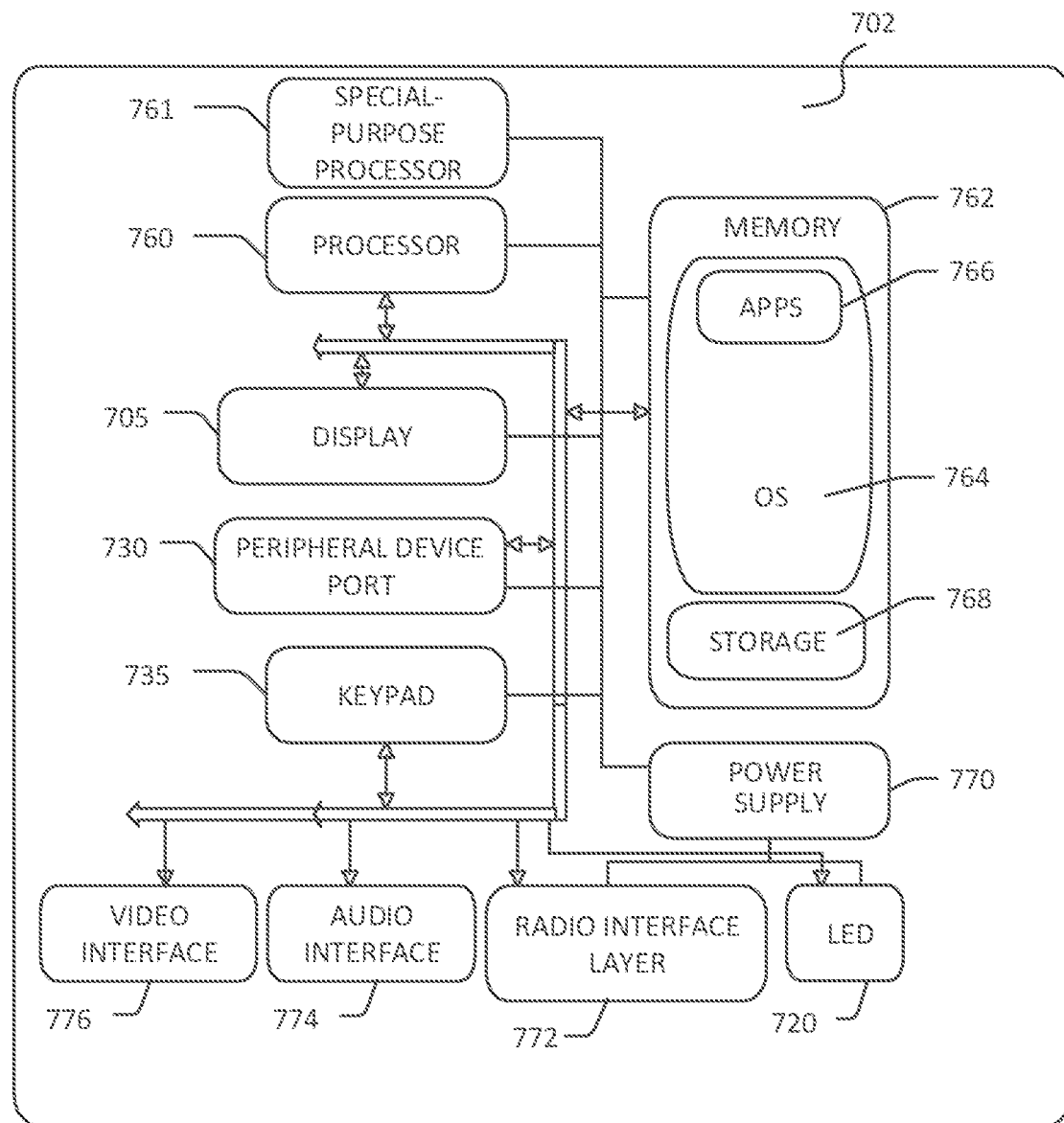

FIGS. 7A and 7B illustrate a mobile computing device 700, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 7A, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display).

If included, an optional side input element 715 allows further user input. The side input element 715 may be a rotary switch, a button, or any other type of manual input element. In alternative aspects, mobile computing device 700 may incorporate more or less input elements. For example, the display 705 may not be a touch screen in some embodiments.

In yet another alternative embodiment, the mobile computing device 700 is a portable phone system, such as a cellular phone. The mobile computing device 700 may also include an optional keypad 735. Optional keypad 735 may be a physical keypad or a "soft" keypad generated on the touch screen display.

In various embodiments, the output elements include the display 705 for showing a graphical user interface (GUI), a visual indicator 720 (e.g., a light emitting diode), and/or an audio transducer 725 (e.g., a speaker). In some aspects, the mobile computing device 700 incorporates a vibration transducer for providing the user with tactile feedback. In yet another aspect, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700 described herein (e.g., search engine, extractor module, relevancy ranking module, answer scoring module, etc.).

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 720 may be used to provide visual notifications, and/or an audio interface 774 may be used for producing audible notifications via the audio transducer 725. In the illustrated embodiment, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 730 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

Figure 8:
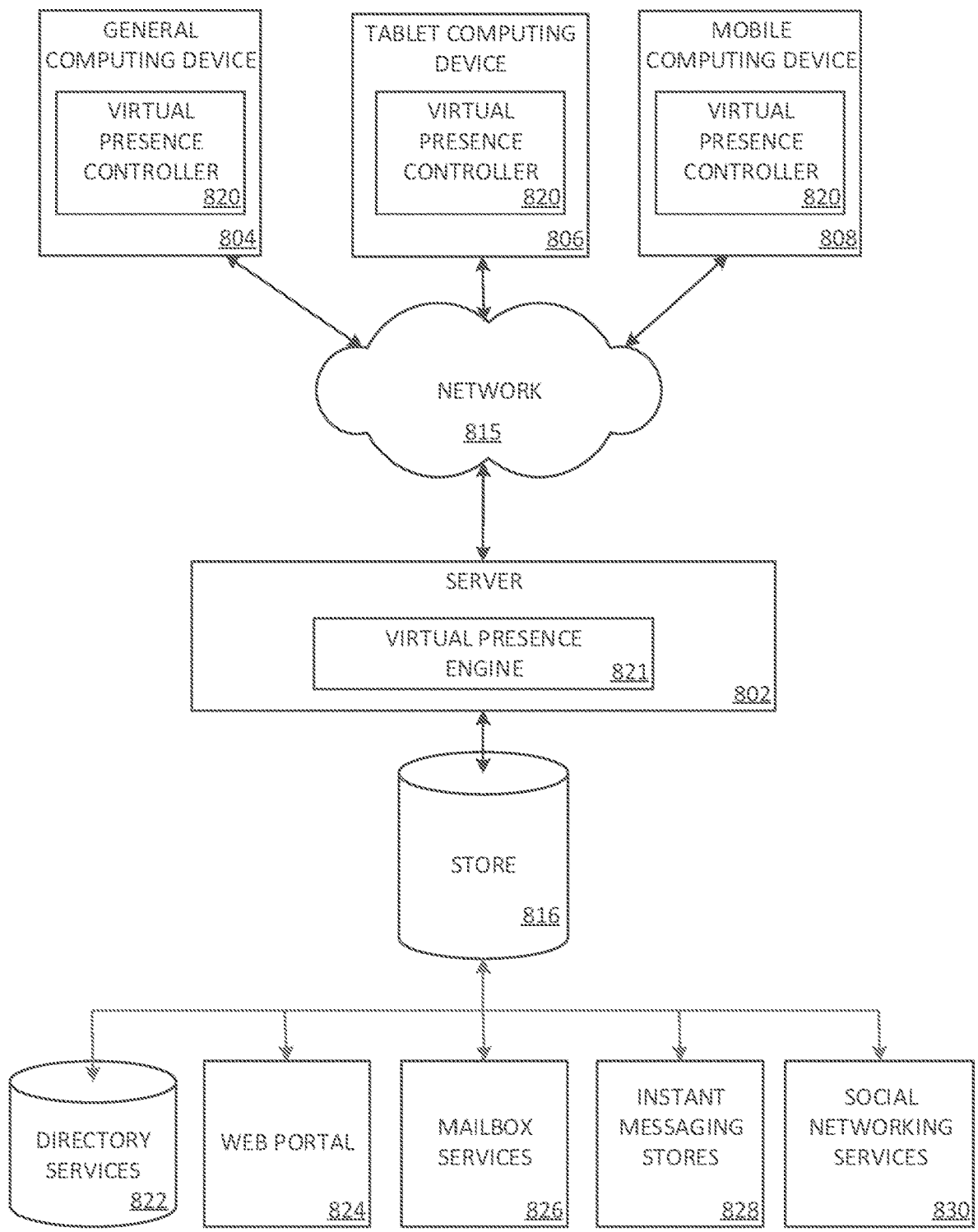
FIG. 8 is a simplified block diagram of a distributed computing system in which aspects of the present disclosure may be practiced.

FIG. 8 illustrates one aspect of the architecture of a system for processing data received at a computing system from a remote source, such as a personal computer 804, tablet computing device 806, or mobile computing device 808, as described above. Content displayed at server device 802 may be stored in different communication channels or other storage types. For example, various documents may be stored using a directory service 822, a web portal 824, a mailbox service 826, an instant messaging store 828, or a social networking site 830.

A virtual presence controller 820 (e.g., performing aspects similar to those of controls 174 and/or 176 discussed above with respect to FIG. 1B) may be employed by a client that communicates with server device 802, and/or virtual presence engine 821 may be employed by server device 802. The server device 802 may provide data to and from a client computing device such as a personal computer 804, a tablet computing device 806 and/or a mobile computing device 808 (e.g., a smart phone) through a network 815. By way of example, the computer system described above may be embodied in a personal computer 804, a tablet computing device 806 and/or a mobile computing device 808 (e.g., a smart phone). Any of these embodiments of the computing devices may obtain content from the store 816, in addition to receiving graphical data useable to be either pre-processed at a graphic-originating system, or post-processed at a receiving computing system.

Figure 9:
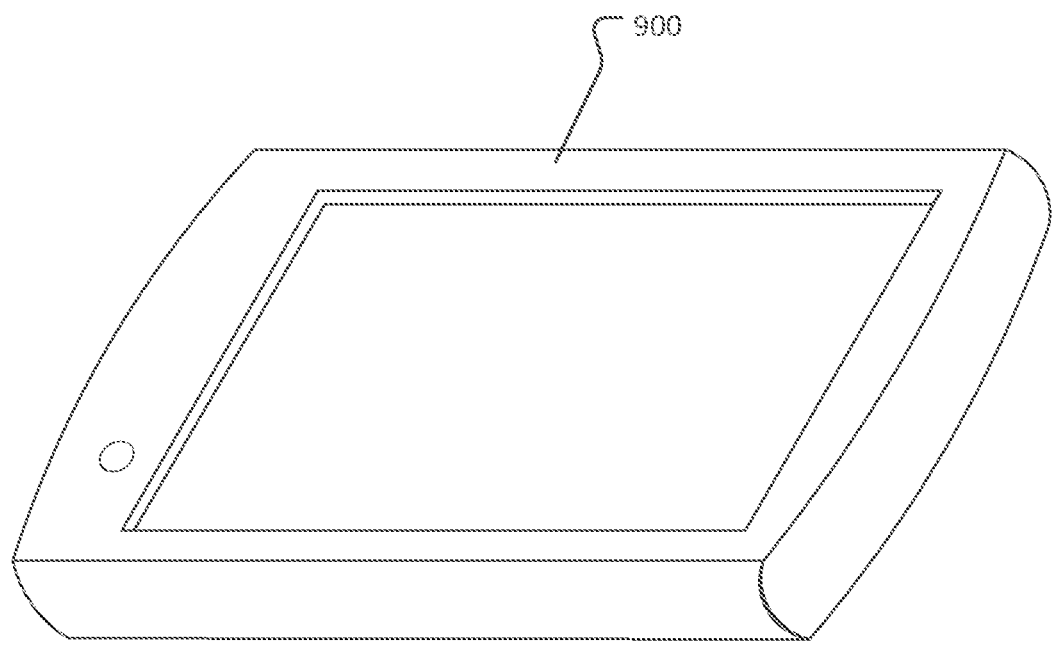
FIG. 9 illustrates a tablet computing device for executing one or more aspects of the present disclosure.

FIG. 9 illustrates an exemplary tablet computing device 900 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As will be understood from the foregoing disclosure, one aspect of the technology relates to a system comprising: at least one processor; and memory storing instructions that, when executed by the at least one processor, causes the system to perform a set of operations. The set of operations comprises: determining whether video communication is available for a communication session between a user of the system and a video participant; and based on determining video communication is not available: obtaining input data associated with a headset device; processing the input data to identify a user movement input; generating a virtual presence for the user based on the user movement input; and transmitting the virtual presence for display to the video participant. In an example, determining video communication is not available comprises at least one of: identifying a user preference to disable video communication; or determining an image capture device is not available for video communication. In another example, the set of operations further comprises: processing input data of the headset device to identify a user emotion input; and updating the virtual presence based on the user emotion input. In a further example, the user emotion input comprises at least one of an indication of an emotion type or an indication of an emotion intensity. In yet another example, transmitting the virtual presence comprises rendering a video feed of the virtual presence. In a further still example, the virtual presence is generated according to a user selection of a virtual presence from a set of virtual presences. In an example, the headset device is an audio headset device and the method further comprises providing, from the computing device to the headset device, audio output associated with the communication session.

In another aspect, the technology relates to a method for controlling a virtual presence by a headset device. The method comprises: obtaining sensor data associated with the headset device worn by a user; generating, based on the sensor data, a user movement input; generating, based on the sensor data, a user emotion input; and providing, to a computing device, an indication of the user movement input and the user emotion input to control a virtual presence of a communication session in which the user is a non-video participant. In an example, at least a part of the sensor data associated with the headset device is obtained from an extensibility device coupled with the headset device. In another example, the extensibility device generates sensor data associated with the user emotion input. In a further example, the user movement input is generated based on sensor data associated with at least one of: an inertial measurement unit; a touch sensor; a proximity sensor; or an infrared depth perception sensor. In yet another example, the method further comprises: receiving, from the computing device, control information comprising an indication to begin sensor data processing associated with the virtual presence. In a further still example, the method further comprises: receiving, from the computing device, control information comprising an indication to end sensor data processing associated with the virtual presence; and after the indication to end sensor data processing, processing audio output associated with the communication session received from the computing device, where the user is a video participant of the communication session.

In a further aspect, the technology relates to a method for generating a virtual presence for a user based on a headset device worn by the user. The method comprises: determining whether video communication is available for a communication session between a user of the system and a video participant; and based on determining video communication is not available: obtaining input data associated with a headset device; processing the input data to identify a user movement input; generating a virtual presence for the user based on the user movement input; and transmitting the virtual presence for display to the video participant. In an example, determining video communication is not available comprises at least one of: identifying a user preference to disable video communication; or determining an image capture device is not available for video communication. In another example, the method further comprises: processing input data of the headset device to identify a user emotion input; and updating the virtual presence based on the user emotion input. In a further example, the user emotion input comprises at least one of an indication of an emotion type or an indication of an emotion intensity. In yet another example, transmitting the virtual presence comprises rendering a video feed of the virtual presence. In a further still example, the virtual presence is generated according to a user selection of a virtual presence from a set of virtual presences. In an example, the headset device is an audio headset device and the method further comprises providing, from the computing device to the headset device, audio output associated with the communication session.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processor; and
   memory storing instructions that, when executed by the at least one processor, causes the system to perform a set of operations, the set of operations comprising:
   determining whether video communication is available for a communication session between a user of the system and a video participant; and
   based on determining video communication is not available:

obtaining input data associated with a headset device;

processing the input data to identify a user movement input and determine based on the user movement input, an emotion intensity for the user;

generating a virtual presence for the user based on the user movement input and the determined emotion intensity; and transmitting the virtual presence for display to the video participant.

2. The system of claim 1, wherein determining video communication is not available comprises at least one of:

identifying a user preference to disable video communication; or determining an image capture device is not available for video communication.

3. The system of claim 1, wherein the input data comprises at least one of an indication of an emotion type or an indication of an emotion intensity.

4. The system of claim 1, wherein transmitting the virtual presence comprises rendering a video feed of the virtual presence.

5. The system of claim 1, wherein the virtual presence is generated according to a user selection of a virtual presence from a set of virtual presences.

6. The system of claim 1, wherein the headset device is an audio headset device and the method further comprises providing, from the computing device to the headset device, audio output associated with the communication session.

7. The system of claim 1, wherein the emotion intensity for the virtual presence is modulated based on a context associated with the user.

8. A method for controlling a virtual presence by a headset device, the method comprising:

obtaining sensor data associated with the headset device worn by a user;

generating, based on the sensor data, a user movement input;

generating, based on the sensor data, a user emotion input and, based on the user movement input, an emotion intensity for the user emotion input; and providing, to a computing device, an indication of the user movement input and the user emotion input to control a virtual presence of a communication session in which the user is a non-video participant.

9. The method of claim 8, wherein an extensibility device removably coupled to the headset device generates sensor data associated with the user emotion input.

10. The method of claim 8, wherein the user movement input is generated based on sensor data associated with at least one of:

an inertial measurement unit;
a touch sensor;
a proximity sensor; or
an infrared depth perception sensor.

11. The method of claim 8, further comprising:
receiving, from the computing device, control information comprising an indication to begin sensor data processing associated with the virtual presence.

12. The method of claim 11, further comprising:
receiving, from the computing device, control information comprising an indication to end sensor data processing associated with the virtual presence; and after the indication to end sensor data processing, processing audio output associated with the communication session received from the computing device, where the user is a video participant of the communication session.

13. The method of claim 8, wherein an extensibility device is electrically coupled to the headset device and at least a part of the sensor data is obtained from the extensibility device.

14. A method for generating a virtual presence for a user based on a headset device worn by the user, the method comprising:

determining whether video communication is available for a communication session between a user of the system and a video participant; and based on determining video communication is not available:

obtaining input data associated with a headset device;

processing the input data to identify a user movement input and determine, based on the user movement input, an emotion intensity for the user;

generating a virtual presence for the user based on the user movement input and the determined emotion intensity; and transmitting the virtual presence for display to the video participant.

15. The method of claim 14, wherein determining video communication is not available comprises at least one of:

identifying a user preference to disable video communication; or determining an image capture device is not available for video communication.

16. The method of claim 14, wherein the user emotion input comprises at least one of an indication of an emotion type or an indication of an emotion intensity.

17. The method of claim 14, wherein transmitting the virtual presence comprises rendering a video feed of the virtual presence.

18. The method of claim 14, wherein the virtual presence is generated according to a user selection of a virtual presence from a set of virtual presences.

19. The method of claim 14, wherein the headset device is an audio headset device and the method further comprises providing, from the computing device to the headset device, audio output associated with the communication session.

20. The method of claim 14, wherein the emotion intensity for the virtual presence is modulated based on a context associated with the user.

* * * * *